US008943368B2

(12) United States Patent
Kaiser et al.

(10) Patent No.: US 8,943,368 B2
(45) Date of Patent: Jan. 27, 2015

(54) METHOD FOR COMPUTER-AIDED DETECTION OF ERRORS DURING THE EXECUTION OF ONE OR MORE SOFTWARE-BASED PROGRAMS IN A SYSTEM OF COMPONENTS

(75) Inventors: Dietmar Kaiser, Moosburg (DE); Michael Haneberg, Munich (DE); Marc Bechler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 146 days.

(21) Appl. No.: 13/334,909

(22) Filed: Dec. 22, 2011

(65) Prior Publication Data

US 2012/0096318 A1 Apr. 19, 2012

Related U.S. Application Data

(63) Continuation of application No. PCT/EP2010/057977, filed on Jun. 8, 2010.

(30) Foreign Application Priority Data

Jun. 27, 2009 (DE) .......................... 10 2009 030 774

(51) Int. Cl.
*G06F 11/00* (2006.01)
*G06F 11/07* (2006.01)

(52) U.S. Cl.
CPC ........ *G06F 11/0787* (2013.01); *G06F 11/0718* (2013.01); *G06F 11/0739* (2013.01)
USPC ........................................ 714/38.1; 701/29.1

(58) Field of Classification Search
CPC ... G06F 11/36; G06F 11/3608; G06F 11/362; G06F 11/366; G06F 11/3668; G01M 17/00
USPC ............... 714/26, 38.1, 48, 49; 717/124, 126, 717/128, 132, 133; 701/29.1
See application file for complete search history.

(56) References Cited

U.S. PATENT DOCUMENTS 5,948,107 A 9/1999 Ramanathan
(Continued)

FOREIGN PATENT DOCUMENTS

WO    WO 97/19403 A1    5/1997

OTHER PUBLICATIONS

Tanenbaum, Andrew S.; "Structured Computer Organization (Second Edition)"; Prentice Hall, Inc.; 1984; pp. 10-12.*
International Preliminary Report on Patentability dated Jan. 26, 2012 (nine (9) pages).
"Exit status", Wikipedia, the free encyclopedia, May 12, 2009, http://en.wikipedia.org/w/index.php?title=Exit_status&oldid=289439700, Nov. 30, 2010. (Three (3) pages).
(Continued)

*Primary Examiner* — Scott Baderman
*Assistant Examiner* — Joseph Kudirka
(74) *Attorney, Agent, or Firm* — Crowell & Moring LLP

(57) ABSTRACT

A method detects errors during execution of software based programs in a system of motor vehicle components. During execution a component executes its assigned program, and the components call each other interactively. When a component is called, a program identity and an error parameter are transmitted from the other component to the component. If a component identifies an error during execution, it stores an active error entry that contains the program identity, the component identification and an error status. If a component, which has called another component, receives the component identification, it stores a passive error entry that contains the program identity, its component identification and the identification of the other component. A component, which stores one or more active or passive error entries, returns the program identity and the component identification of the component, at least once during program execution, to the component that has called it.

16 Claims, 13 Drawing Sheets

(56) References Cited

U.S. PATENT DOCUMENTS

| | | | | |
|---|---|---|---|---|
| 5,974,568 | A * | 10/1999 | McQueen | 714/38.13 |
| 6,208,948 | B1 * | 3/2001 | Klingler et al. | 702/183 |
| 7,120,901 | B2 * | 10/2006 | Ferri et al. | 717/128 |
| 7,171,337 | B2 * | 1/2007 | Yuan et al. | 702/185 |
| 7,240,247 | B2 * | 7/2007 | Petri et al. | 714/57 |
| 7,512,738 | B2 * | 3/2009 | Balakrishnan et al. | 711/132 |
| 7,681,182 | B1 * | 3/2010 | Mistry et al. | 717/132 |
| 2003/0204804 | A1 | 10/2003 | Petri et al. | |
| 2006/0271771 | A1 | 11/2006 | Cartony et al. | |

OTHER PUBLICATIONS

Heinecke, H. et al., "Autosar—Current results and preparations for exploitation", 7th Euroforum conference 'Software in the vehicle' May 3-4, 2006, Stuttgart, Germany. (Eight (8) pages).

German Search Report dated Dec. 14, 2010 including partial English-language translation (Nine (9) pages).

International Search Report dated Sep. 9, 2010 including English-language translation (Six (6) pages).

* cited by examiner

METHOD FOR COMPUTER-AIDED DETECTION OF ERRORS DURING THE EXECUTION OF ONE OR MORE SOFTWARE-BASED PROGRAMS IN A SYSTEM OF COMPONENTS

CROSS-REFERENCE TO RELATED APPLICATIONS

This application is a continuation of PCT International Application No. PCT/EP2010/057977, filed Jun. 8, 2010, which claims priority under 35 U.S.C. §119 from German Patent Application No. DE 10 2009 030 774.5, filed Jun. 27, 2009, the entire disclosures of which are herein expressly incorporated by reference.

BACKGROUND AND SUMMARY OF THE INVENTION

The invention relates to a method for computer aided detection of errors during the execution of one or more software based programs in a system of components, in particular in a motor vehicle.

In a plurality of industrial sectors, in particular also in the field of automotive engineering, the proportion of software in functions that are to be executed in the corresponding technical system, in particular the motor vehicle, is becoming increasingly more complex. In the normal case the software programs are executed in a distributed system composed of a plurality of components. At this point and in the following the term "component" is broadly defined and can include any unit with one or more functionalities during the program run. In particular, a component is a technical component with technical functions or more specifically a technical device, such as a control unit, with corresponding software, or a part of a device. Similarly, the components can also involve functions or objects in the sense of a programming language, which executes portions of a program within the system. A component can also be, in particular, a software component in the sense of the known AUTOSAR standard.

When a program is running, software errors always occur during the runtime and often sporadically. Furthermore, the cause and effect of such errors are often not time dependent. This factor makes it much harder to correct the errors when software errors occur, because the software errors cannot be reproduced, the conditions of their occurrence cannot be reconstructed, and in general it is not clear where to look for the cause of the errors.

In the field of vehicle diagnostics, the current approach is to store the detected errors in the form of so-called DTCs (diagnostic trouble codes) in the corresponding technical components, i.e., the control devices. However, there is no functional link between the error entries that are generated by this method, and the errors can be correlated only by way of the time of their occurrence.

Therefore, the object of the invention is to detect errors during the execution of a software program in a suitable manner so that thereafter the detected errors can be subjected to an improved diagnosis in order to find the reason for the error.

This and other objects are achieved in accordance with the methods, systems, and diagnostic devices disclosed herein.

In the method according to the invention, each component of the system is assigned an identification, and a respective running program is specified by a program identity. During the execution of the respective program, a component executes its assigned portion of the program, and, furthermore, the components call each other, at least to some extent, interactively, during the program run.

The method according to the invention provides that, when a component is called by another component, a program identity and an error parameter are transmitted from the other component to the component. The error parameter indicates whether an error has been identified beforehand during the execution of the program. If a component identifies an error during the execution of its assigned program portion, the component stores an active error entry that contains the program identity, the identification of the component, and an error status that indicates whether the identified error is the first error during the execution of the program. Hence, an active error entry is an error that occurs in that component, in which the error entry is also stored.

If, in the method according to the invention, a component, which has called another component, receives the identification of the other component from the other component, the component stores a passive error entry that contains the program identity, the identification of the component, and the identification of the other component. A passive error entry makes it possible to specify correspondingly that the error according to the error entry is an error that has occurred in another component as the component, in which the error entry is stored. At the same time the passive error entry indicates that an error has occurred beforehand in the call chain of the program. In this case the storage of the identification of the other component makes it possible to backtrack the call chain, in which the error has occurred.

According to the invention, a component, which stores one or more active or passive error entries during the execution of the program, returns the program identity and the identification of the component, at least once during the execution of the program, to the component, which has called the component. In this way the propagation of the error entries for the purpose of backtracking them during the program run is guaranteed.

The method according to the invention is characterized by the fact that the correspondingly generated active and passive error entries, as well as the transmission of suitable information during the mutual calling of the components, make it possible to trace software errors and also to detect whether the corresponding software error is the first error in the program run or a potential sequence error that perhaps results from the first error.

In a preferred variant of the invention the individual components are control units and/or parts of control units, which communicate with each other by way of corresponding interfaces, so that the active and passive error entries are stored in predefined memory locations of the control units. In this case a preferred application is the execution of a software program in networked control units in a motor vehicle or in a plurality of motor vehicles that communicate with each other.

In an additional preferred variant of the invention the program identity includes an identification of an initiating component, at which the program is started, as well as a corresponding start time of the program.

Another embodiment of the method according to the invention provides that, in the case that following the execution of a program portion by means of a component no errors occur in the subsequently executed program portions, the program identity and a parameter are returned to the component from a component that was called by the component. At the same time the parameter indicates that the subsequently executed program portions are error free, and upon receipt of the parameter in the component no passive error entry is stored in the component.

This feature enables suitable feedback in the respective component that following the execution of its assigned program portion no errors have occurred, and, thus, no passive error entry has to be stored in the component. Hence, the parameter replaces the identification of the called component that is returned when an error occurs.

Another variant of the method according to the invention provides that when a component is called, a call entry is stored in the component at least to some extent during the execution of the program. This approach also allows call chains that have run without errors to be detected in a program run. Preferably, a call entry in the component contains the identification of the component that has called the component. In this way the call chains of correctly running program portions can also be reconstructed. In this context there is the possibility that after the occurrence of the first error during the execution of the program the call entries are stored in the respective components. If desired, it is also possible to store call entries during the entire execution of the program.

In an additional, especially preferred embodiment of the method according to the invention, a respective error entry (that is, an active or passive error entry) in a component is described by a field having a plurality of values. In this respect, the program identity is specified in the field, and, furthermore, the field includes a first value that specifies the identification of the component, which stores the error entry, as well as a second value that specifies the component, in which the error has occurred (corresponds in the case of an active error entry to the component that stores the error entry), and a third value that indicates whether the error entry is a passive error entry or an active error entry. In the case of an active error entry, the third value also specifies whether the error is the first error during the execution of the program. The terms "first value," "second value," and "third value" specify only corresponding types of values and do not automatically indicate where the corresponding value may be found in the field.

In the variant of the inventive method, in which the program identity is established by the identification of the initiating component and the start time, the field for describing the error entry contains two values for specifying the program identity. In this case one of the values represents the identification of the initiating component, and the other of the values, the start time.

According to the above described method for detecting errors, the invention also relates to a method for processing errors that were identified with this method. In this case the stored active and passive error entries are read out, and for each program identity a fault tree is generated from the associated active and passive error entries and transmitted. The fault tree contains at least the call chains of the components that are called one after the other in succession and contain at least one component with an active error entry. In the fault tree, the components are characterized as to whether no error, the first error, or a potential sequence error has occurred in the respective component during the execution of the program. This information lends itself well to backtracking the relationships of the individual errors in the fault tree. The subsequent errors that occur after the first error represent potential sequence errors, and the fault tree makes it possible to identify, in particular, the original error and/or the other potential sequence errors, from which a corresponding sequence error could have resulted. Furthermore, if in the course of detecting errors the above described call entries should also be included, then the fault tree may also contain, if desired, those call chains, in which all of the components have correctly executed their portion of the program.

An additional variant of the method for reconstructing the fault tree is based on the detection of errors by use of the error entries that are specified by the above described fields. In this case the fault tree is generated in such a way that proceeding from each component with an active error entry, the respective call chains of the components that are called one after the other in succession are determined step by step by way of the first and the second value of the fields of the error entries.

In addition to the described method, the invention also relates to a system of components, especially in a motor vehicle, wherein the system is configured such that during the execution of one or more software based programs the errors are identified with the above described method for detecting errors. Moreover, the invention relates to a motor vehicle, which comprises such a system.

Furthermore, the invention relates to a diagnostic device for processing the errors detected with the above described method. In this context the diagnostic device is configured such that the device can carry out the above described method for processing the errors that are detected accordingly.

Other objects, advantages and novel features of the present invention will become apparent from the following detailed description of one or more preferred embodiments when considered in conjunction with the accompanying drawings.

DETAILED DESCRIPTION OF THE DRAWINGS

Embodiments of the method according to the invention are described below on the basis of a distributed system of a plurality of control units in a motor vehicle.

In this case the functions that are to be executed by the individual control units are implemented by means of software. Therefore, the execution of a software program is examined, wherein the individual control units call each other interactively. The program run provides that upon completion of the corresponding program functions in a control unit, another control unit is called. The control units represent "components" as the term is used herein.

The individual control units have defined interfaces for communication and communicate among each other by way of the bus system of the motor vehicle. The control units can also be any unit for carrying out the functionalities in the vehicle, for example, an electronic engine control unit, the control unit of airbags, the control unit of electric servomotors, for example, for seat adjustment, the control unit of the air conditioning system in the vehicle, the control unit of the display units in the vehicle, and the like. A "program run" in this system of components is, for example, the actuation of the individual servomotors of an automatic seat adjustment mechanism, which adjusts the seat based on a preprogrammed seat setting that is stored for a person in the vehicle.

In the course of executing a software program in the above described distributed system of components, there is the problem that there are no suitable mechanisms that detect the software errors that occur during the runtime of the program in such a way that it is possible to track the errors in order to identify the cause or, more specifically, the initiator of the individual errors. According to the following described embodiments of the invention, the software errors are detected and stored in the error memory of the individual components in such a way that when the errors are read out at a later date, a suitable fault tree can be generated. Hence, the invention comprises, first of all, a method that lends itself well to detecting software errors on-board in the vehicle and, secondly a method for assembling the detected software errors off-board into a fault tree.

Figure 1:
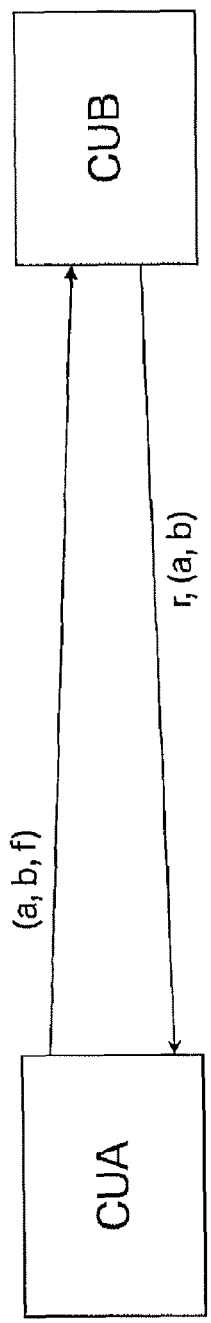
FIG. 1 is a schematic drawing of the exchange of information in a call of a second component by a first component according to an embodiment of the method according to the invention.

FIG. 1 shows, by and large, the communication between a calling control unit CUA (CU=control unit) and a called control unit CUB. In the following a calling control unit is also referred to as a first control unit or a first component respectively, and a called control unit is also referred to as a second control unit or a second component respectively. In this context it is assumed in the following that each component can be identified by a unique identification, for example, a UUID (UUID=universal unique identifier) or a software ID, and the calls of one component by another occur during the program run. In addition, there exist suitable mechanisms for storing the software errors, which are identified by the component during a program run, in the error memories of the components. Furthermore, the embodiment described herein considers the synchronous call of components. However, the invention may also be applied in an analogous manner to non-synchronous calls.

According to FIG. 1, when the second component CUB is called by the first component CUA, the parameter triple (a, b, f) is transmitted as additional parameters. In this case, the parameter "a" denotes the identification of the component that originally initiated the running program. Insofar as the program starts at the component CUA, the parameter a agrees with the identification of the component CUA. The parameter "b" specifies the time, at which the program at the initiating component was started, that is, the time, at which the corresponding customer function in the vehicle was initiated based on the program. Thus, the combination of the parameters a and b characterizes the current execution of a program, and this combination corresponds to a "program identity" as the term is used herein. The parameter "f" represents an error parameter and indicates whether an error in a component already occurred beforehand during the execution of the program. If no error was identified beforehand, then the error parameter f is set to 0. If an error did occur, then the parameter f is set to 1 during the subsequent execution of the program.

After the called component CUB has processed the corresponding program functions, a return in the form of a parameter "r" as well as the already aforementioned parameters a and b are fed back to the first component CUA. The return value r is always set to 0, if no error was identified in the component CUB, and the component has not been notified by other components that are called at a later date about the occurrence of an error. In all other cases the parameter r contains the identification of the component CUB as the value.

When the program is running, the corresponding error entries are generated in the error memories of the individual components, so that both the active error entries and the passive error entries are stored in the error memories. In this context an active error entry is generated, when an error has occurred in the corresponding component itself, and a passive error entry is generated when a component receives from another component the identification of the other component as the return value r. Therefore, the identification of the called component is always transmitted as the return value r, when an error has occurred in this component itself or when the called component receives a return value that is not equal to 0 from the component that it itself calls.

In FIGS. 5 to 12 described below, the corresponding error entries of the components are given as vectors with five values in square brackets. In general, the first value of the vector is denoted with the letter a; the second value, with b; the third value, with i; the fourth value, with p; and the fifth value with e, as shown accordingly in FIG. 5. Therefore, an error entry can generally be described as a vector [a, b, i, p, e]. In this case a corresponds in turn to the program run of the originally initiating component; and b, the start time, at which the program at the initiating component is started. In contrast, i denotes the identity of the component that is currently storing the corresponding error entry. The origin of the error is established by the parameter p. If a component itself identifies a software error, then the component's own identity is entered here. If the identity of the called component was transmitted in the return value r, which the component under consideration receives from the component it has called, then this identity is used for the parameter p. Hence, it is transmitted by way of the parameter p whether there is or is not an active error entry of an error that has occurred locally in the component under consideration.

The parameter e indicates the type of error. If a software error is detected for the first time ("primary error") in a call chain of components that follow one another in succession, then e is set to 1 in the corresponding component. Then, when the next component is called, the parameter f is set to 1 and remains at 1 even during all subsequent calls of components. If a component was already called when f=1, then e is set to 2 when an error in the called component is identified. In this way it is indicated that an error that has occurred is a potential sequence error.

If a called component reports an error to the calling component (that is, the identification of the called component is returned as the parameter r), then a passive error memory entry is performed, wherein e is set to 0. Thus, this error entry indicates that an error was detected by another component. Furthermore, when setting a passive error entry, the corresponding component has to return to the preceding component its own identification as the return value r, if said corresponding component has not transmitted beforehand a return value r≠0. In addition, the generation of passive error entries is necessary for producing at a later date the call sequence of the components when generating the fault tree.

Figure 2:
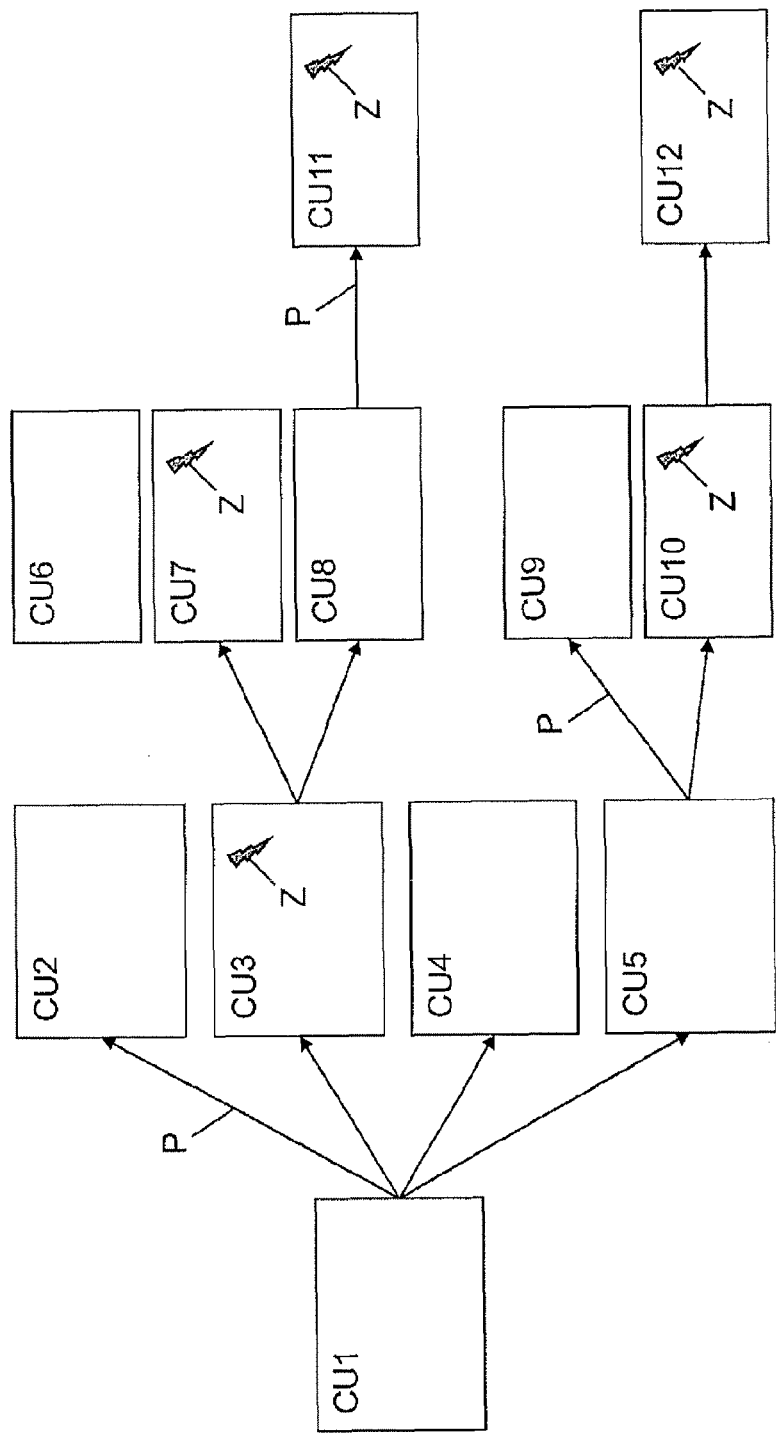
FIG. 2 is a schematic drawing of a system of components and their interaction, on the basis of which an embodiment of the method according to the invention is described.

FIG. 2 shows, by way of the example of a system of twelve distributed control units CU1, CU2, . . . , CU12, the program run based on a functional call chain, wherein the calls at the initiating component CU1 occur in a synchronous manner. In this case the calls within the program run are indicated by corresponding arrows, of which only some of them are labeled with the reference symbol P for the sake of a better understanding. One can clearly see that the program run starts at the component CU1 as the initiating component. This component calls the four components CU2, CU3, CU4 and CU5. Then, the component CU3 calls the components CU7 to CU8, whereupon then the component CU8 calls the component CU11. Furthermore, the component CU5 calls the components CU9 and CU10, whereupon the component CU10 calls the component CU12. During the program run in FIG. 2 the errors that are indicated by the corresponding jagged arrows Z occur during the processing of the program portions in the components CU3, CU7, CU10, CU11 and CU12.

At this point an embodiment for detecting software errors based on the corresponding error entries, as well as the above described exchange of parameters (FIG. 1), is described using the system of components in FIG. 2 and the illustrated program run. In the following the numerals 01, 02, ..., 12 denote in each case the identification of the respective component CU1, CU2, ... CU12. In contrast, the letter t denotes the time, at which the program starts, that is, the initiation time of the program by the component CU1.

Figure 3:
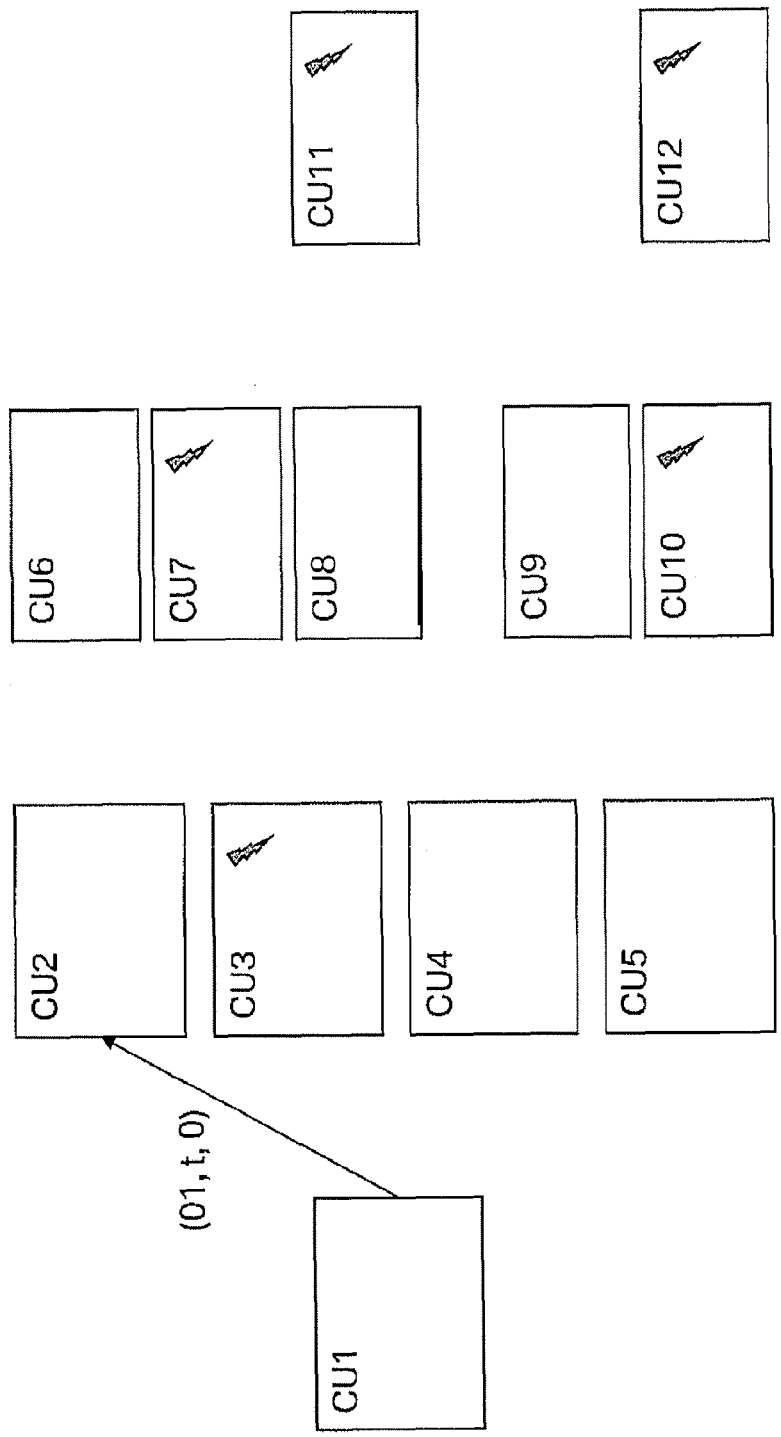
FIGS. 3-12 are schematic drawings, which show by way of example the execution of a program in the system from FIG. 2 and the error detection that is used thereby, based on an embodiment of the method according to the invention.
Figure 4:
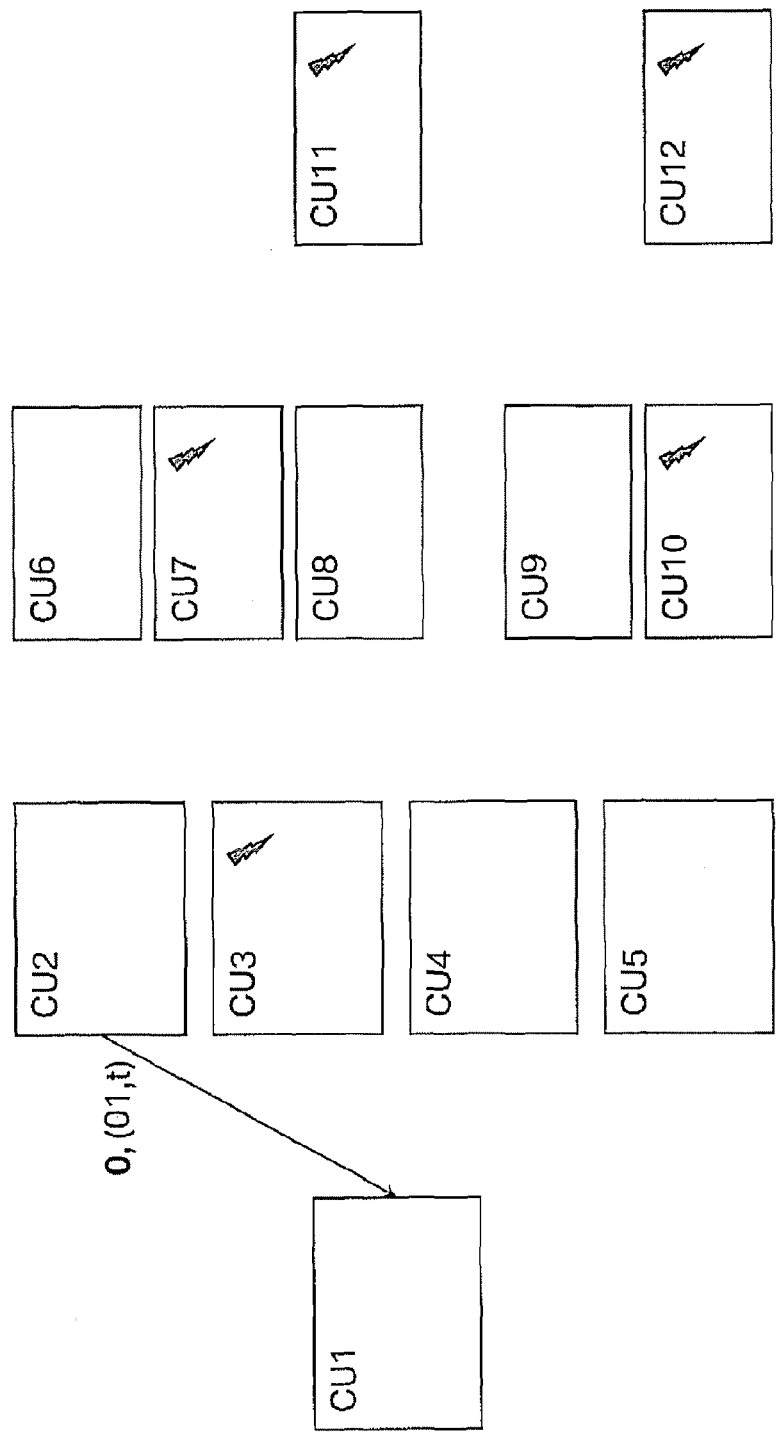

According to FIG. 3, the component CU1 calls the component CU2 with the parameters a=01, b=t and f=0. According to FIG. 4, the component CU2 sends back in response to the call the return value r=0 as well as the identification 01 of the initiating component and the initiation time t, because no error has occurred in the component CU2, and the component also no longer calls any successive components.

Figure 5:
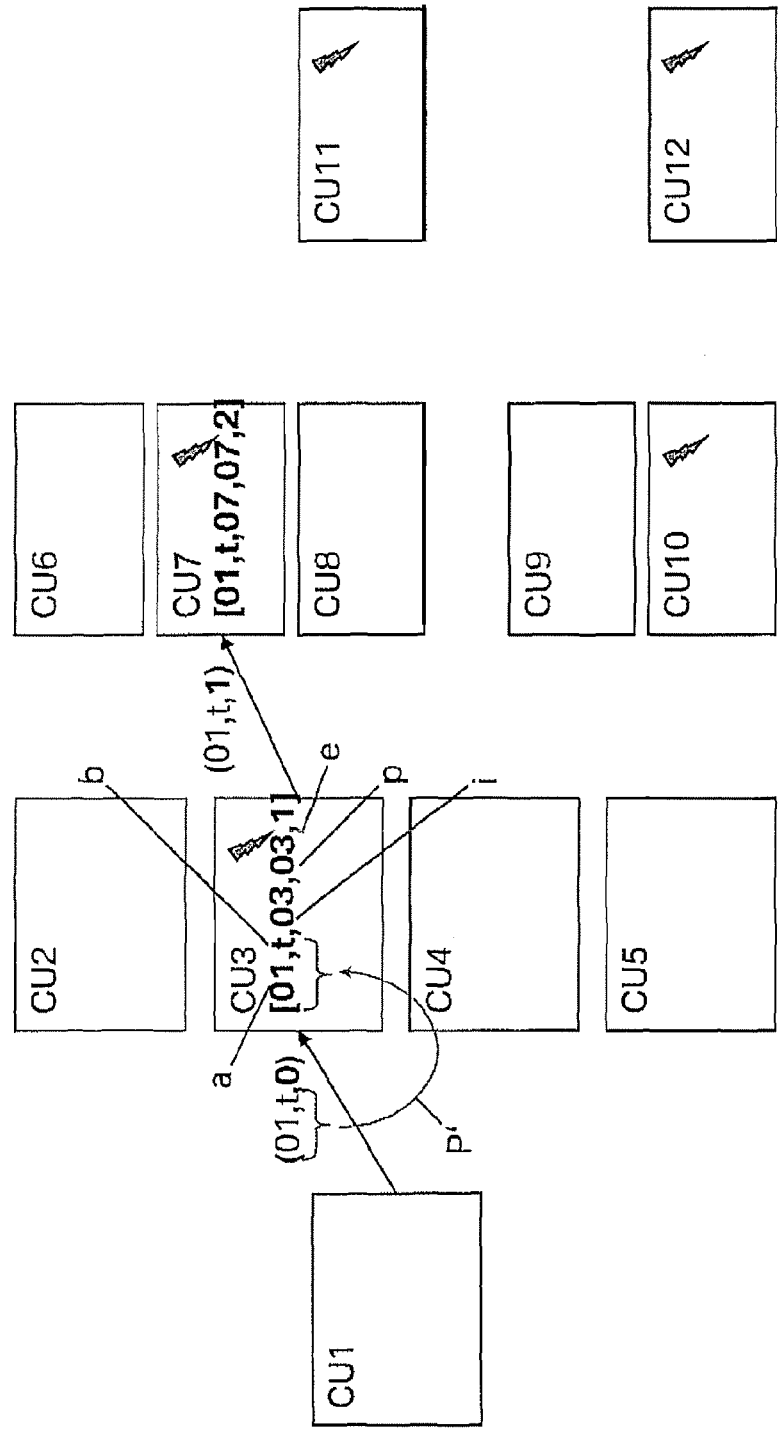

According to FIG. 5, the initiating component CU1 calls the component CU3. An error has occurred locally in the component CU3. Consequently the error entry [01, t, 03, 03, 1] is generated. The parameter p is set to 03, because the error occurred locally in the component CU3. The parameter e is set to 1, because it is the first error occurring in the program run. When the component CU1 called the component CU3, the identity 01 of the initiating component CU1 as well as the initiation time t were transmitted, and they in turn are taken over as the first two values in the error entry, as indicated by the arrow P' in FIG. 5. Since at this point an error has occurred in the component CU3, the component CU7 is sent not only the identification 01 of the initiating component CU1 and the initiation time t but also the parameter f=1. Then the called component CU7 executes its program functions, during the course of which an error occurs again locally. As a result, the error entry [01, t, 07, 07, 2] is generated, where the value p=7 indicates that it involves a local error. In contrast e=2 indicates that the occurring error is not the first error in the program run, a state that means that it can be a potential sequence error that can result from the error of another component.

Figure 6:
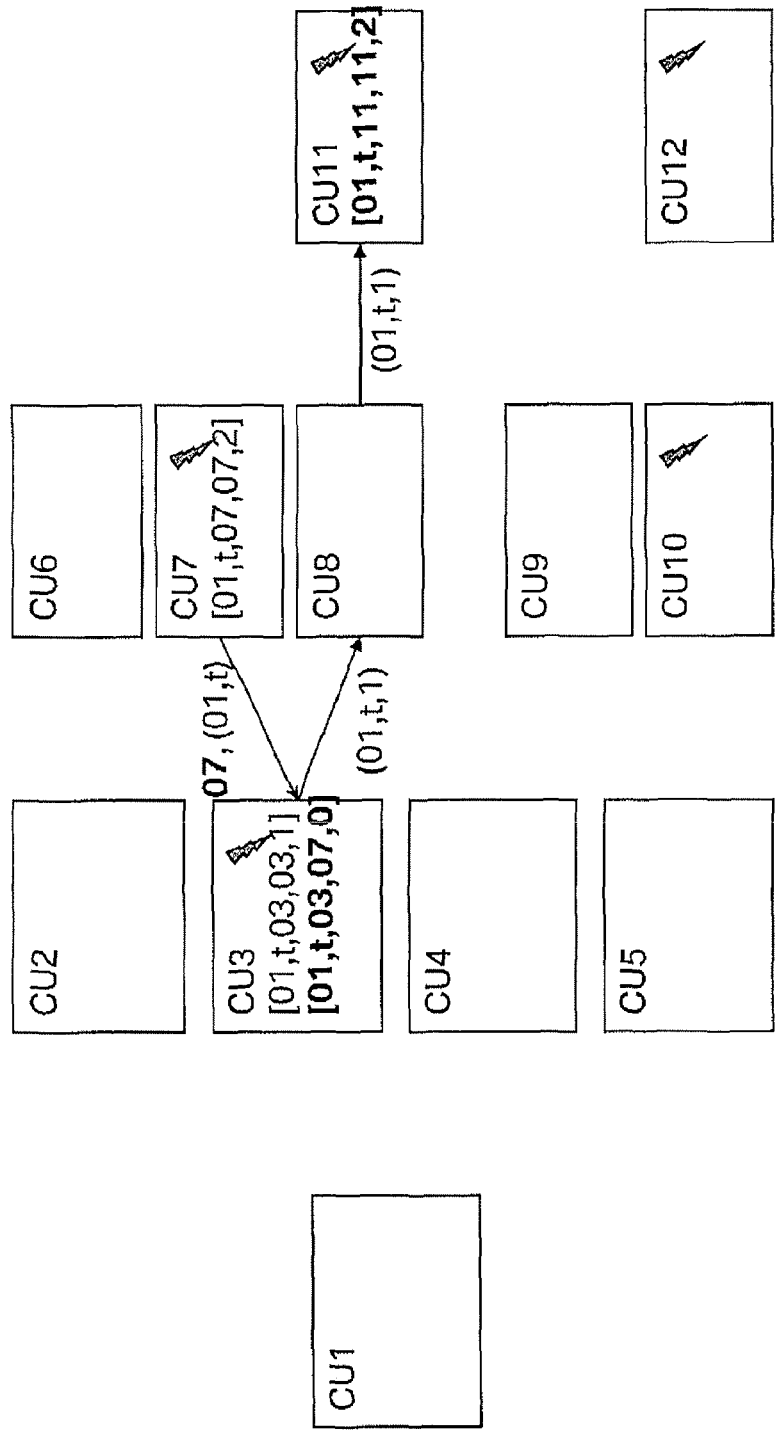

As shown in FIG. 6, the component CU7 reports back, after executing its program functions, not only the identification 01 of the initiating component 01 and the initiation time t, but also the value r=07, because an error occurred in the component CU7. Thereupon the error entry [01, t, 03, 07, 0] is generated in the component CU3, as a result of which it is indicated by p=07 and e=0 that it involves a passive error entry that originates from an error going back to CU7. Then the component CU8 is called by the component CU3. In so doing, the parameter f=1 is sent in addition to the identification 01 of the initiating component and the initiation time t. During the program execution no error occurs in the component CU8. Then the component CU8 transmits during the call of the component CU11 to this component the identification 01 of the initiating component, the initiation time t and the parameter f=1.

In turn a local error occurs in the component CU11. As a consequence, the active error entry [01, t, 11, 11, 2] is generated in this component CU11. In so doing, e=2 indicates that it involves a potential sequence error in the component CU12.

Figure 7:
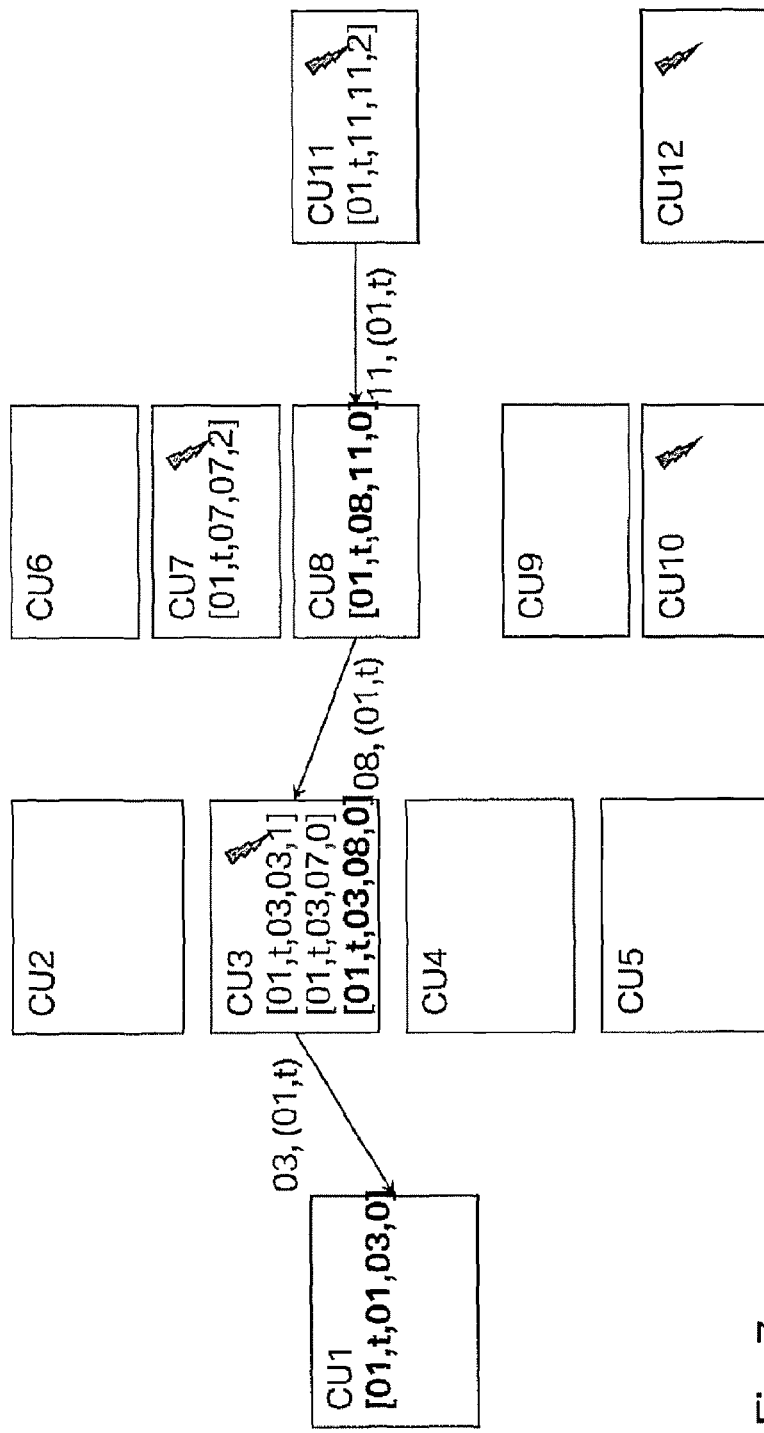

As shown in FIG. 7, the identification 11 of the component CU11 is also returned, in addition to the identification 01 of the initiating component and the initiation time t, to the component CU8, as a result of the error occurring in CU11. This process generates in turn a passive error entry in the form of [01, t, 08, 11, 0]. As a result, not only the identification 01 of the initiating component and the initiation time t, but also the identity 08 of the component CU8 are returned to the component CU3. Then after the generation of the passive error entry [01, t, 03, 08, 0] in the component CU3, the identification 03 of the component CU3 together with the identification 01 of the initiating component and the initiation time t are returned in an analogous manner to the component CU1. As a result, the passive error entry [01, t, 01, 03, 0] in CU1 is generated.

Figure 8:
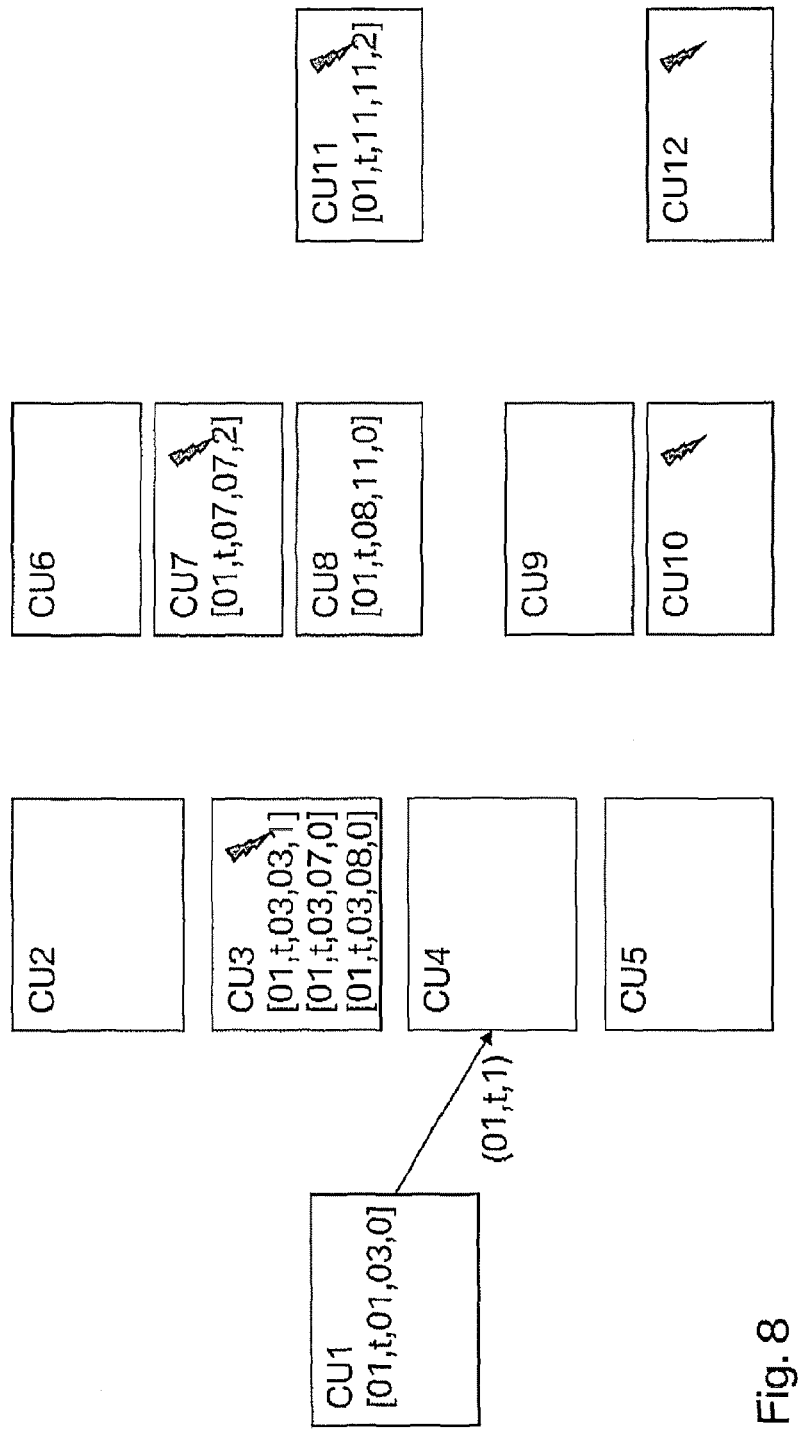
Figure 9:
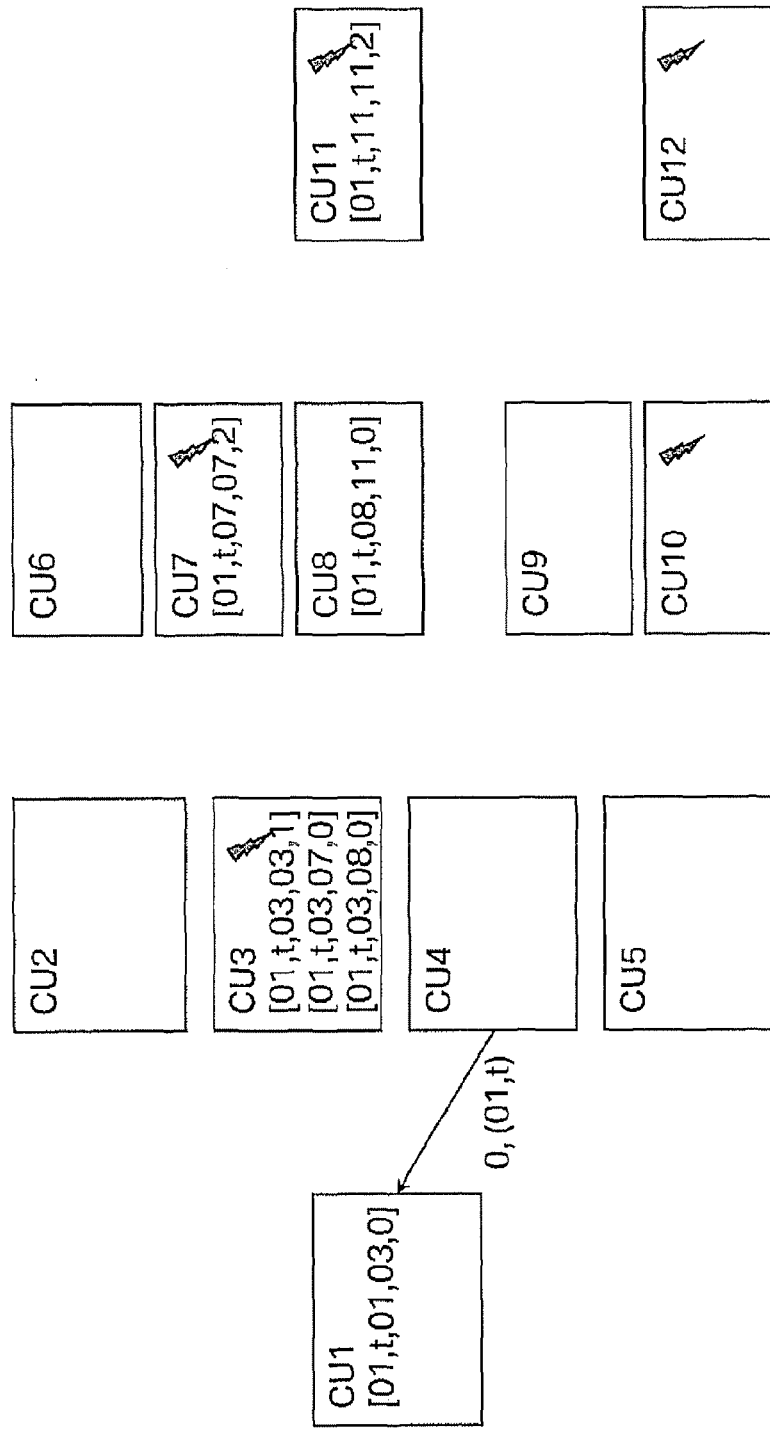

According to FIG. 8, the initiating component CU1 calls the component CU4 and, in so doing, sends its identification 01, the initiation time t and the parameter f=1. Since no error has occurred in the component CU4, and the program does not continue from there, the component CU4 returns, according to FIG. 9, not only the identification 01 of the initiating component and the initiation time t, but also the parameter r=0, to CU1. As a consequence, no additional error entry is generated in the component CU1.

Figure 10:
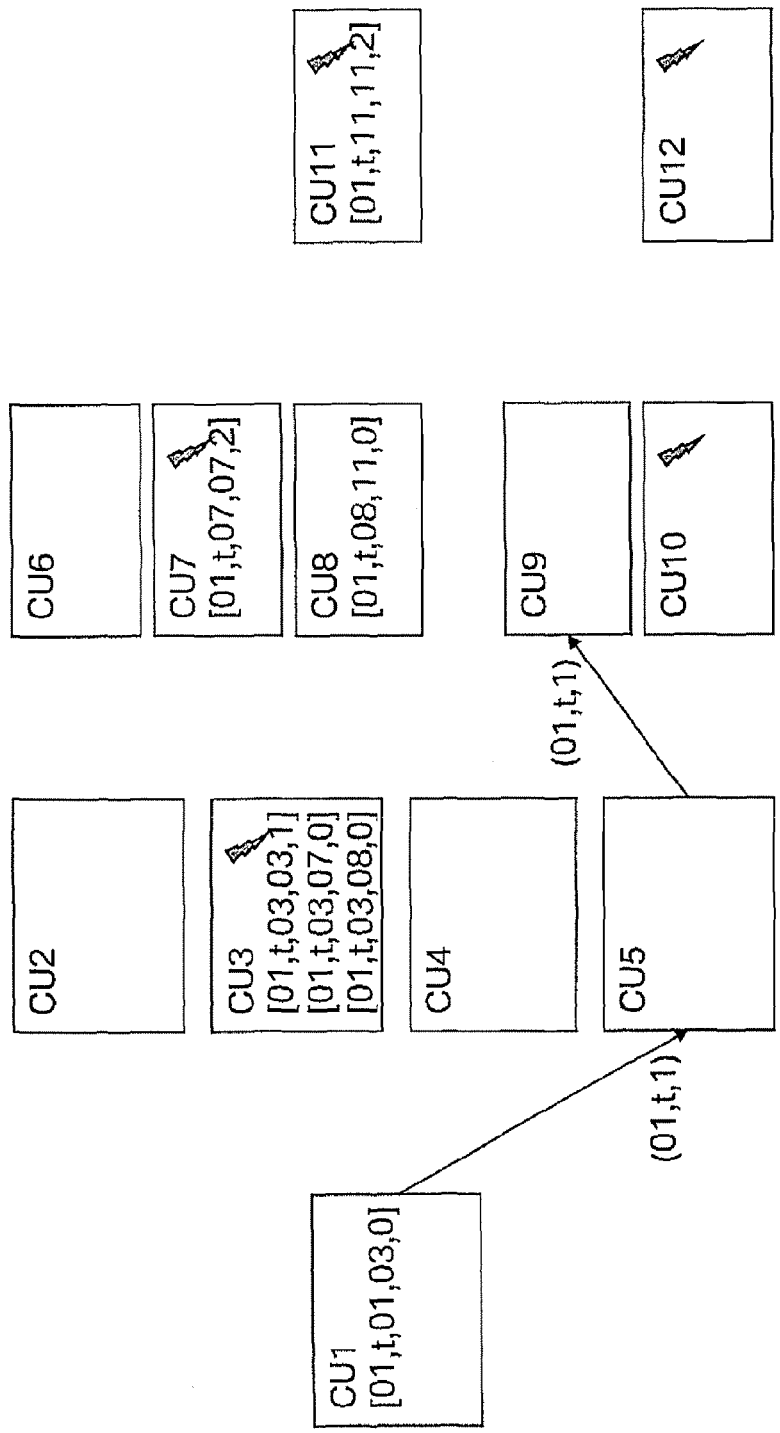

According to FIG. 10, the component CU1 calls the component CU5, which executes its program functionalities without error and then calls the component CU9, which also executes its program functionalities without error. At the same time the identification 01 of the initiating component, the initiation time t and f=1 are transmitted in turn. Since no error has occurred in this program chain, no active error entries are generated in the components CU1, CU5 and CU9.

Figure 11:
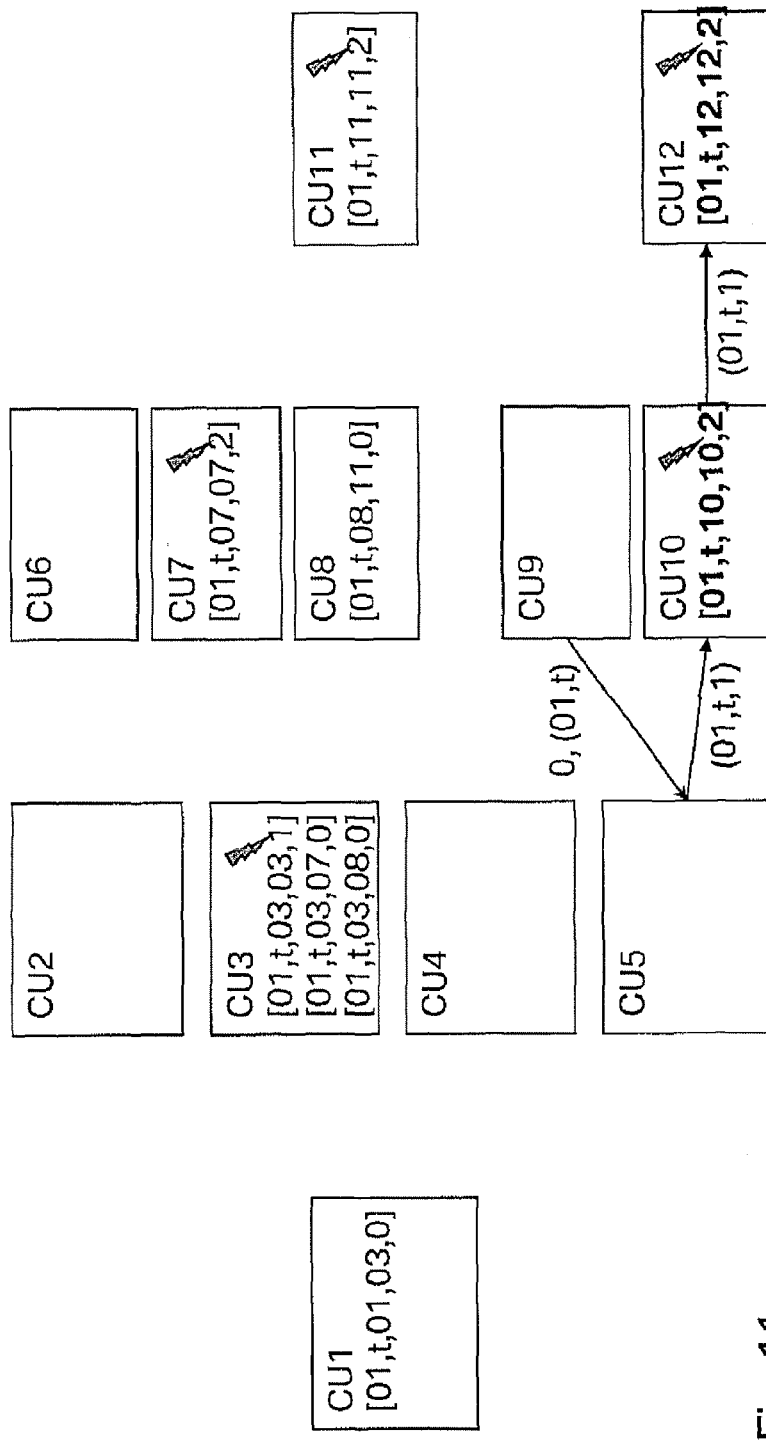

FIG. 11 shows the return of the corresponding parameter value r=0 to the component CU5 from the component CU9. Furthermore, FIG. 11 shows the call of the component CU10 by the component CU5, in the course of which in turn the identification 01 of the initiating component and the initiation time t as well as the parameter f=1 are transmitted. Since a local error occurs in the component CU10, active error entry [01, t, 10, 10, 2] is stored there.

Then the component CU10 calls the component CU12 and, in so doing, transmits in turn the identification 01 of the initiating component, the initiation time t and the parameter f=1. Then during the program run an additional local error occurs in the component CU12, so that the active error entry [01, t, 12, 12, 2] is stored there.

Figure 12:
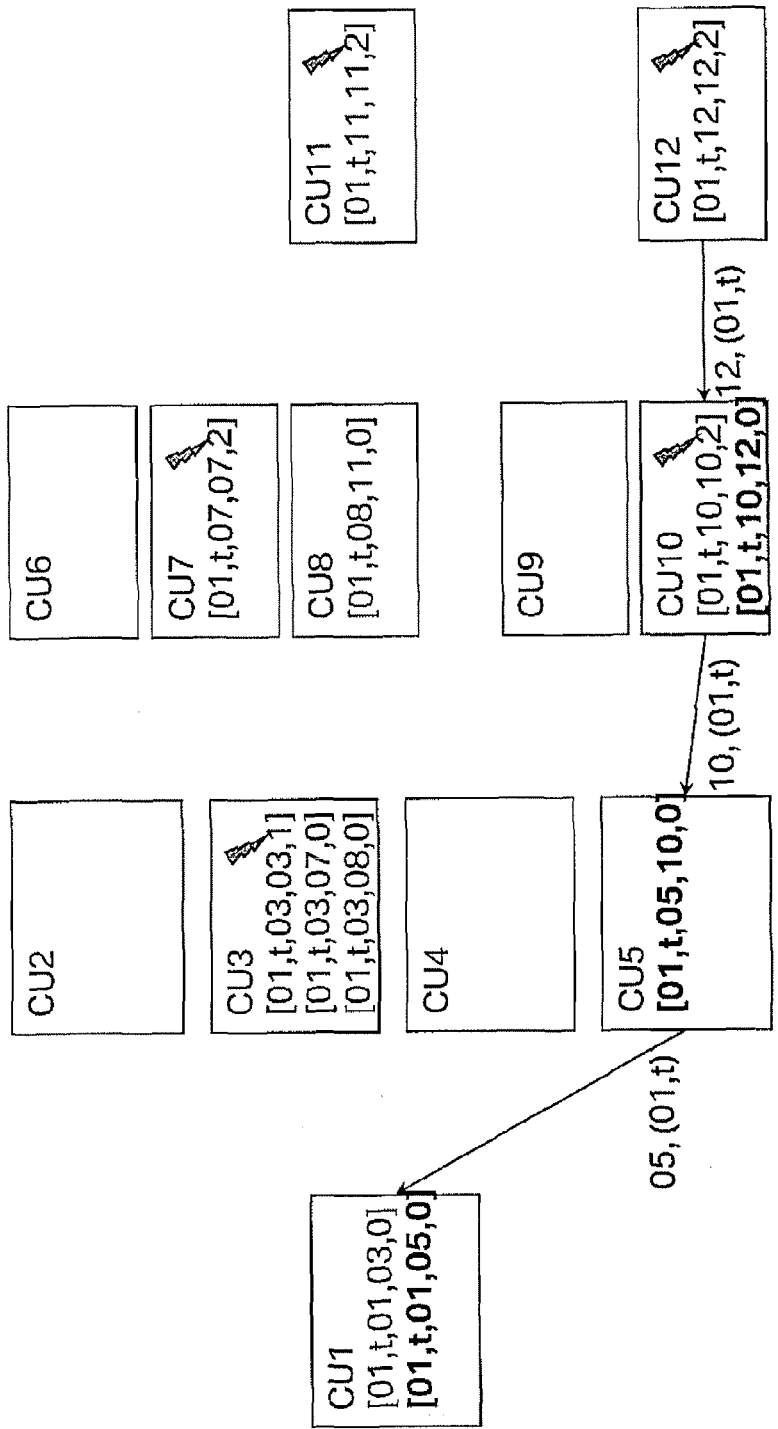

It is very clear from FIG. 12 that after execution of the program functions of the component CU12, not only the identification 01 of the initiating component and the initiation time t, but also the identification 12 of the component CU12 are returned to the component CU10 owing to the error that occurred in the component CU12. Since the parameter r is not equal to 0, a passive error entry in the form of [01, t, 10, 12, 0] is generated at this point in the component CU10. Owing to the error entries in CU10, the parameter r=10 is sent to the component CU5, in addition to the identification 01 of the initiating component and the initiation time t. Since the parameter r is again not equal to 0, a corresponding passive error entry [01, t, 05, 10, 0] is also stored in the component CU5. Due to this passive error entry, both the parameter r=05 as well as the identification 01 of the initiating component and the initiation time t are returned to the component CU1. Then a passive error entry in the form of [01, t, 01, 05, 0] is generated in the component CU1 because of r≠0.

In FIG. 12 the program execution is then terminated. Thus, FIG. 12 shows all of the error entries that are stored in the individual components in the above described program run. These error entries are read out of the error memories of the components with a suitable diagnostic device. Then, a corresponding fault tree is generated, as described below with reference to FIG. 13.

A read-out of the error entries yields, first of all, the following list for the error entries of the individual components:
CU1: [01, t, 01, 03, 0] [01, t, 01, 05, 0]
CU2: –
CU3: [01, t, 03, 03, 1] [01, t, 03, 07, 0] [01, t, 03, 08, 0]
CU4: –
CU5: [01, t, 05, 10, 0]
CU6: –
CU7: [01, t, 07, 07, 2]
CU8: [01, t, 08, 11, 0]
CU9: –
CU10: [01, t, 10, 10, 2] [01, t, 10, 12, 0]
CU11: [01, t, 11, 11, 2]
CU12: [01, t, 12, 12, 2]

In the above list all error entries with e=2, which represent potential sequence errors, are shown in italics. Furthermore, the error entry, which specifies the first error in the program run, that is, for which e=1 applies, is printed in bold. This error entry is stored in the component CU3. In order to generate the fault tree, those components that contain a local error entry, that is, have identified in themselves an error during the program run, are defined then as the entry points of the corresponding call chains. They contain, according to the above list, all of the components, which contain at least one error entry and which exhibit a parameter e that is not equal to 0. They are, according to the above list of components, CU3, CU7, CU10, CU11 and CU12.

Starting from the identifications of the components having at least one error entry with e≠0, a corresponding call chain is constructed in such a way that for each component a search is made for that component that contains the identification of the respective component as the fourth value in the error entry. That is, proceeding on the basis of the third value i of the error entry one searches in the respective component for a component that contains an error entry, whose fourth value matches the third value of the respective component. For the component CU12 the result is that the component CU10 has such an error entry, that is [01, t, 10, 12, 0]. Then the process is repeated in an analogous manner with the component that was found. That is, once more one searches for a component that contains, based on the error entries of the component that has just been found, an error entry that has a fourth value that matches the third value of the error entries of the component that has just been found. This process is continued until one finally arrives at the initiating component CU1. Therefore, according to the above example, one proceeds from the component CU10 that was found to search then for components that contain entries that have the identification 10 as the fourth value. According to the above list, this is the case for the component CU5. Starting from this component, one searches for a component that contains an entry that has the identification 05 as the fourth value. This is the initiating component CU1. This strategy lends itself well to backtracking the chain of a local error.

Figure 13:
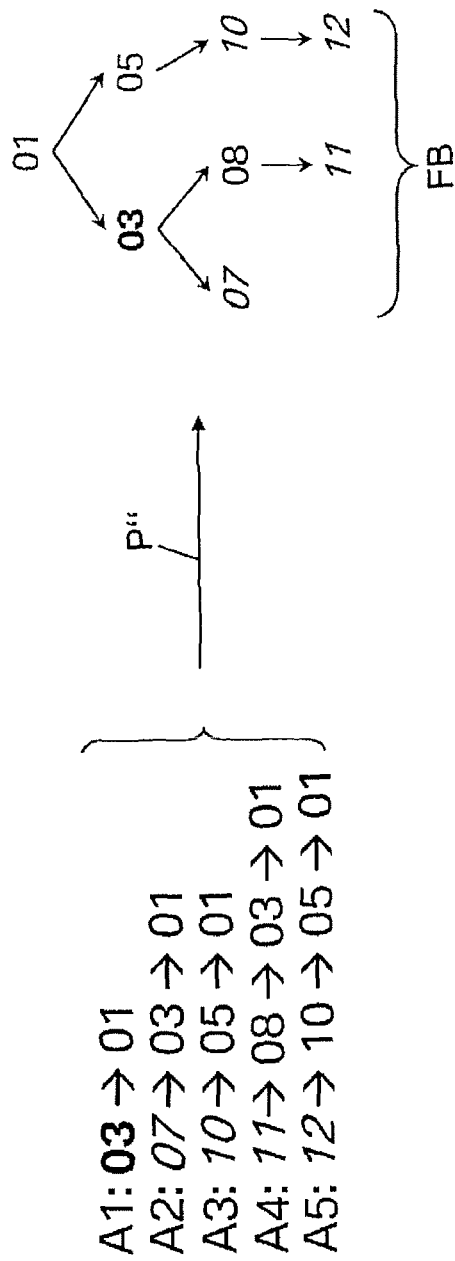
FIG. 13 is a schematic drawing, which shows, according to an embodiment of the method according to the invention, the read out of the errors, detected in the program run, according to FIG. 3 to FIG. 12, and the generation of a fault tree, based thereon.

According to FIG. 13, the results for the individual identifications 03, 07, 10, 11 and 12 of the respective components CU3, CU7, CU10, CU11 and CU12 are the call chains A1 to A5. Then these call chains are reversed in their order of sequence and assembled into a fault tree FB, as indicated by the arrow P". The order of sequence of the calls results from the order of sequence of the error entries stored in a component. For example, an error entry for CU3 is stored first in the component CU1; thereafter an error entry for CU5 is stored. The result is that CU1 has called the component CU3 first and thereafter CU5. In this fault tree the starting point is the identification 01 on the highest hierarchical level, from which then the relationships to the identifications, which exist, according to the reverse call chains, on the lower hierarchical levels, are formed. Hence, in the fault tree in FIG. 13 the identification 01 is connected in the reverse direction of the call chains A1 to A5 to the identifications 03 and 05. Consequently the second hierarchical level of the fault tree FB contains the identifications 03 and 05. Then the search for identifications on the next hierarchical level is conducted in the same way. According to the call chains in FIG. 13, the result of such a search is that the identification 03 is connected to both the identification 07 and the identification 08. In contrast, the identification 05 is connected only to the identification 10. That is, the fault tree FB branches off from the identification 03 to the identifications 07 and 08. In contrast, the fault tree branches off from the identification 05 only to the identification 10. The result for the next lower hierarchical level is that the identification 08 is connected to the identification 10, and the identification 10 is connected to the identification 12. In contrast, the identification 07 is already at the beginning of the corresponding call chain A2. Thus, the fault tree branches off from the identification 08 only to the identification 11 and from the identification 10 only to the identification 12.

Since it is known for the individual components whether no error (e=0) has occurred in this component or whether an error has occurred for the first time (e=1) in this component or whether a potential sequence error (e=2) has occurred in this component, this information is suitably coded in the fault tree FB. This state is indicated in the fault tree in FIG. 13 in that the bold printed identification 03 specifies the component, in which an error has occurred for the first time in the program run; the cursive printed identifications 07, 10, 11 and 12 specify components, in which potential sequence errors have occurred; and the identifications 01, 05 and 08 in standard print specify the components, in which no error has occurred.

As apparent from the description of the above exemplary embodiment, the above described storage of the corresponding error entries during a program run can be used in a suitable way to generate a fault tree, which shows the preceding errors, from which a potential sequence error could be generated. In this case it is especially clear from FIG. 13 that the reason for the errors in the component CU7 and CU11 could be perhaps the error in the component CU3, and that the errors in the components 10 and 12 are unrelated to the errors in the components CU3, CU7 and CU11.

The above described embodiment of the method according to the invention can be modified in an appropriate way. In particular, all calls of components can be logged. In this case each call of a component is suitably entered in the component. In this context the entry does not represent an error entry, but rather only specifies that the component was called. According to the above described format of the error entries, such an entry can be specified, for example, by the fact that it contains the identification of the called component as the third and fourth value and the value e=0 as the fifth value. In this case the first or second value corresponds in turn to the identification 01 of the initiating component or the initiation time t respectively. In order to guarantee a complete reconstruction of even correctly running call chains, it is also necessary that for each call the identification of the calling component be stored in the called component.

According to the above modification, there is the possibility that all calls are always recorded after the program start. However, an alternative embodiment also provides that the recording of all call chains is not started until after the first event of an error, that is, when the parameter f assumes the value 1. In this case no information on the call chains is available before the occurrence of the first error. However, the need for memory locations is less than if the calls are logged after the program start.

The above described method for detecting errors and generating fault trees has a number of advantages. In particular, the method provides informative error symptoms, from which functionally related software errors can be abstracted. In addition to the functional relationship the method also differentiates between the initial occurrence of a software error and the potential sequence errors that can result therefrom. Thus, it is ensured that sporadic software errors are easier to understand and reproduce. The method itself is simple and efficient. No status information needs to be kept in the components whatsoever. The only requirement is that there be memory space for the storage of error information. The method operates permanently and, thus, independently of the occurrence of errors. This feature guarantees that in the event of an error the bus communication in the vehicle does not increase, and, thus, the bus load and jitter remain deterministic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for computer aided detection of errors during execution of one or more software based programs in a system of components, wherein each component of the system is a control device configured with an error memory, wherein the control device executes an assigned portion of the one or more software based programs, and wherein each component of the system is assigned an identification and a program identity for a respective running program of one or more software based programs, and further wherein during execution of a program, of the one or more software based programs, the components call each other interactively, at least to some extent, the method comprising the acts of:

when a called component, of the system of components, is called by a calling component, of the system of components, transmitting a program identity of the program and an error parameter from the calling component to the called component via a bus system of a motor vehicle, said error parameter indicating whether an error has been identified beforehand during execution of the program;

if either the called component or the calling component identifies an error during execution of its respective assigned program portion, storing in a first predefined memory location in the error memory of such component an active error entry that contains the program identity, the identification of such component,. and an error status that indicates whether the identified error is a first error during execution of the program; and if the calling component receives the identification of the called component from the called component, storing in a second predefined memory location in the error memory of the calling component a passive error entry that contains the program identity, the identification of the calling component and the identification of the called component, wherein the called component, having one or more active or passive error entries stored during execution of the program in the error memory of such called component, returns the program identity, and the identification of the called component, at least once during execution of the program, to the calling component.

2. The method according to claim 1, wherein the program identity comprises: an identification of an initiating component, at which the program is started; and a start time.

3. The method according to claim 1, further comprising the acts of:

when, following execution of a program portion by the called component, no errors occur in subsequently executed program portions, returning the program identity and a parameter to the calling component from the called component, said parameter indicating that the subsequently executed program portions are error free; and upon receipt of the parameter in the calling component, not storing a passive error entry in the calling component.

4. The method according to claim 1, wherein a call entry is stored in the called component at least temporarily during execution of the program.

5. The method according to claim 3, wherein a call entry is stored in the called component at least temporarily during execution of the program.

6. The method according to claim 5, wherein during an entire program run or only after an occurrence of the first error during execution of the program, call entries are stored in the respective components.

7. The method according to claim 1, wherein the active error entry and passive error entry are each described by a field comprising a plurality of values, wherein the program identity is specified in the field, and further wherein the field includes:
a first value that specifies the identification of the component in which such active error entry and passive error entry are respectively stored;
a second value that specifies the component in which the error has occurred; and
a third value that indicates the passive error entry as being passive or the active error entry as being active, wherein in the case of the active error entry the third value also indicates whether the active error entry corresponds to the first error during execution of the program.

8. The method according to claim 2, wherein the active error entry and passive error entry are each described by a field comprising a plurality of values, wherein the program identity is specified in the field, and further wherein the field includes:
a first value that specifies the identification of the component in which such active error entry and passive error entry are respectively stored;
a second value that specifies the component in which the error has occurred; and
a third value that indicates the passive error entry as being passive or the active error entry as being active, wherein in the case of the active error entry the third value also indicates whether the active error entry corresponds to the first error during execution of the program.

9. The method according to claim 8, wherein the field has two values for specifying the program identity, wherein one of the two values represents the identification of the initiating component, and the other of the two values represents the start time.

10. The method according to claim 1, wherein for processing detected errors, the method further comprises the acts of:
reading out the stored active and passive error entries; and
for each program identity, generating a fault tree from the active and passive error entries; and transmitting said fault tree containing at least call chains of the components and contain at least one component with an active error entry, wherein in the fault tree the components are characterized as to whether no error, the first error, or a later error has occurred with respect to each such component during execution of the program.

11. The method according to claim 7, wherein for processing detected errors, the method further comprises the acts of:

reading out the stored active and passive error entries; and for each program identity, generating a fault tree from the associated active and passive error entries; and transmitting said fault tree containing at least call chains of the components and contain at least one component with an active error entry, wherein in the fault tree the components are characterized as to whether no error, the first error, or a later error has occurred with respect to each such component during execution of the program.

12. The method according to claim 11, wherein the fault tree is generated such that proceeding from each component with an active error entry, the respective call chains of the components are produced step-by-step via the first value and the second value of the field.

13. The method according to claim 1, wherein the system of components comprises a system of motor vehicle components.

14. A system, comprising:

a plurality of motor vehicle control devices each having an interface to a bus system of a motor vehicle and being configured to communicate with each other via said bus system and being operatively configured to detect errors during execution of one or more software based programs in the system, wherein each control device of the system is configured with an error memory and is assigned an identification and a program identity for a respective running program, and further wherein during execution of a program a control device executes an assigned portion of the program, and the control devices call each other interactively, at least to some extent, the system being operatively configured such that:

when a called control device, of the plurality of motor vehicle control devices, is called by a calling control device, of the plurality of motor vehicle control devices, the program identity and an error parameter are transmitted from the calling control device to the called control device via the bus system of a motor vehicle, said error parameter indicating whether an error has been identified beforehand during execution of the program;

if either the called control device or the calling control device identifies an error during execution of its respectively assigned program portion, such control device stores, in a first predefined memory location in the error memory, an active error entry that contains the program identity, the identification of such control device, and an error status that indicates whether the identified error is a first error during execution of the program; and if the calling control device receives the identification of the called control device from the called control device, the calling control device stores, in a second predefined memory location in the error memory, a passive error entry that contains the program identity, the identification of the calling control device, and the identification of the called control device, wherein the called control device, having one or more active or passive error entries stored during execution of the program in the error memory of such called control device, returns the program identity and the identification of the called control device, at least once during execution of the program, to the calling control device.

15. The system according to claim 14, further comprising a motor vehicle in which the system is operatively configured.

16. A device, comprising:

a diagnostic unit operatively configured for processing errors detected in accordance with the method of claim 12.

* * * * *